United States Patent [19]
Gleockler et al.

[11] 3,972,700
[45] Aug. 3, 1976

[54] AIR CLEANER FOR TRACTOR ENGINE

[76] Inventors: Frederick M. Gleockler; Robert G. Gleockler, both of R.D. No. 1, Box 35, Ridgely, Md. 21660

[22] Filed: July 30, 1975

[21] Appl. No.: 600,466

[52] U.S. Cl. .............................. 55/385 B; 55/487; 55/498; 55/509
[51] Int. Cl.² ........................................ B01D 27/08
[58] Field of Search .......... 55/385 B, 482, 485–487, 55/498, 509; 210/497

[56] References Cited
UNITED STATES PATENTS

| | | | |
|---|---|---|---|
| 934,076 | 9/1909 | Kneuper | 55/500 |
| 3,535,852 | 10/1970 | Hirs | 210/497 |
| 3,847,577 | 11/1974 | Hansen | 55/385 |
| 3,884,658 | 5/1975 | Roach | 55/482 |

FOREIGN PATENTS OR APPLICATIONS

| | | | |
|---|---|---|---|
| 115,355 | 7/1942 | Australia | 55/486 |
| 713,560 | 8/1954 | United Kingdom | 55/486 |

*Primary Examiner*—Bernard Nozick
*Attorney, Agent, or Firm*—John N. Randolph

[57] ABSTRACT

A self cleaning air cleaner for a tractor engine which is capable of functioning either alone for cleaning air being supplied by suction to a carburetor of a gasoline engine or to the turbocharger of a diesel engine, or which can function as a pre-cleaner for air being supplied to a conventional air filter.

4 Claims, 4 Drawing Figures

AIR CLEANER FOR TRACTOR ENGINE

BACKGROUND OF THE INVENTION

Great difficulty is encountered in keeping air cleaners of tractor engines sufficiently clean so that an accumulation of dirt and grit is not drawn through a filter or filters of the air cleaner and into the engine resulting in considerable damage to the engine.

SUMMARY

It is a primary object of the present invention to provide an air cleaner which may be readily kept in a clean condition capable of functioning properly for supplying air to either the carburetor of gasoline engine or the turbo-charger of a diesel engine, and which air is sufficiently clean so that it will not cause damage to the engine.

Another object of the invention is to provide an air cleaner which may function either as a sole means for removing dirt and other foreign matter from air being supplied to a tractor engine, or which may function as an adjunct to a conventional tractor air cleaner, for pre-cleaning the air prior to its entering a conventional air cleaner.

Still another object of the invention is to provide an air cleaner which, due to its upright position, permits dust, grit and other foreign matter which has been removed from air being supplied to a tractor engine, to be discharged by gravity from the air cleaner when operation of the engine is interrupted.

Various other objects and advantages of the invention will hereinafter become more fully apparent from the following description of the drawings, illustrating a presently preferred embodiment thereof,

DESCRIPTION OF THE PREFERRED EMBODIMENT

Figure 1:
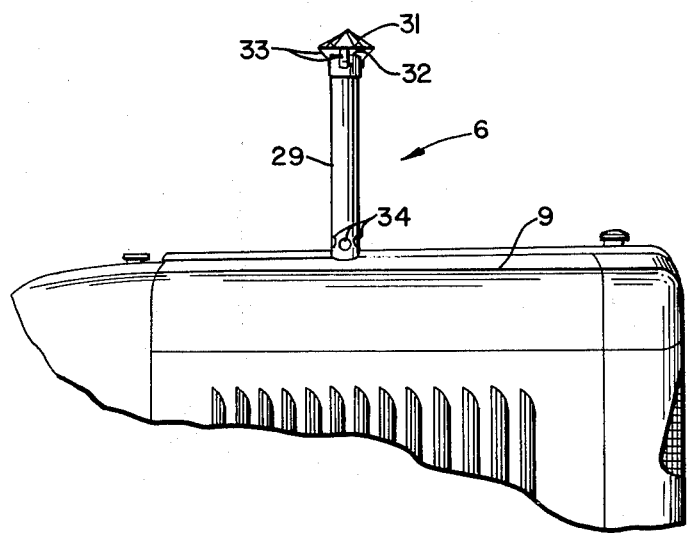
FIG. 1 is a fragmentary side elevational view of the upper portion of the engine hood of a tractor showing the air cleaner mounted thereon.

Referring more specifically to the drawings, the air cleaner in its entirety and comprising the invention is designated generally 6. As illustrated in the drawings, the air cleaner 6 is shown in association with a conventional air cleaner 7 of a tractor engine and which has a rigid inlet pipe or tube 8 extending upwardly therefrom through the hood 9. The air cleaner 7 also has an outlet conduit or hose 10 which connects with the air intake of the engine carburetor or turbocharger, not shown.

The air cleaner 6 includes a rigid tube 11 having a plurality of relatively large openings 12 formed therein and therearound, substantially from end to end thereof. A collar 13 of rubber or similar elastic material has an upper end which is stretched over and suitably secured around the lower end of the tube 11. A lower end of the collar 13 engages around the upper end of the inlet tube 8, above the engine hood 9, and is detachably secured thereto by conventional clamp 14.

A sheet of mesh wire fabric 15 is wrapped around the tube 11, and a sheet of porous filter paper 16 is wrapped around the mesh wire fabric cylinder 15 and is secured in place by a plurality of elastic bands 17. A cap or cover 18 is secured over the upper end of the filter cylinder 16 by an additional band 17 for closing the upper end of the tube 11. A thick elastic bushing 19, preferably formed of rubber, is disposed around the lower end of the filter cylinder 16.

The parts 11, 15, 16, 17 and 18 combine to form a first or inner filter unit 26. The air cleaner 6 includes a second or outer filter unit 27 composed of a substantially rigid tube 20 of a somewhat larger diameter than the tube 11 and having a multiplicity of openings 21 which may be larger than the openings 12. The tube 20 is covered by a cylinder 22 of mesh wire fabric around which is disposed a cylinder 23 of porous filter paper. Elastic bands 24 retain the cylinders 22 and 23 around the tube 20. A cap or closure 25, of substantially the same construction as the closure 18, closes the upper end of the tube 20 and is retained in position by an additional band 24. The tube 20 of said filter unit 27 fits over the filter unit 26 and is held against casual movement relative thereto by the gasket 19 which engages the bore of the tube 20 and is compressed thereby to frictionally grip said tube for steadying the filter unit 27 on the filter unit 26.

A collar 28, which may be formed of wood, engages around the inlet tube 8 directly beneath the collar 13 and rests on a part of the engine hood 9. The collar 28 has an outer diameter greater than the maximum diameter of the filter unit 27.

Figure 3:
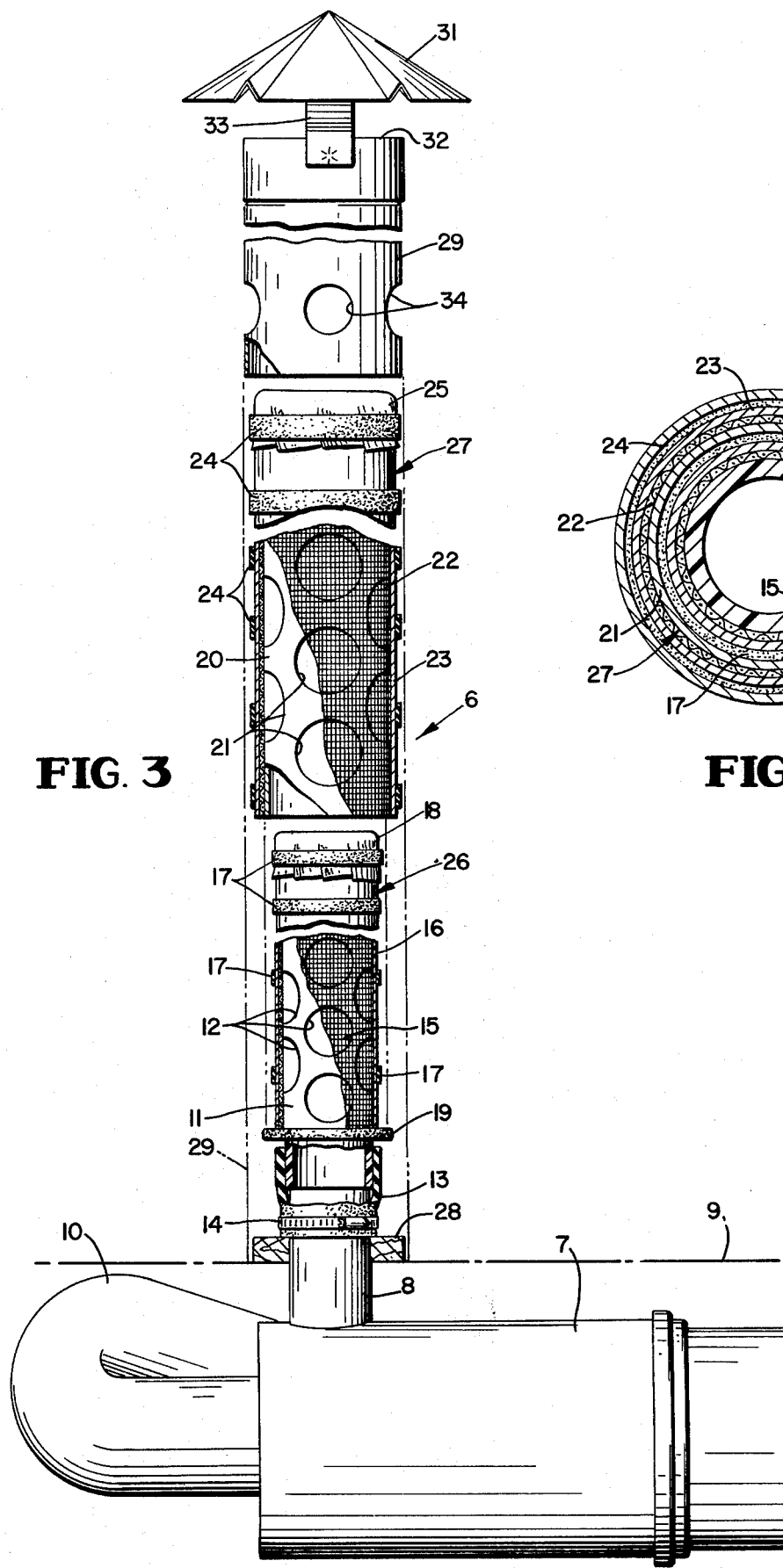
FIG. 3 is an enlarged view of the air cleaner, partly in side elevation, partly in vertical section, and partly broken away.
Figure 4:
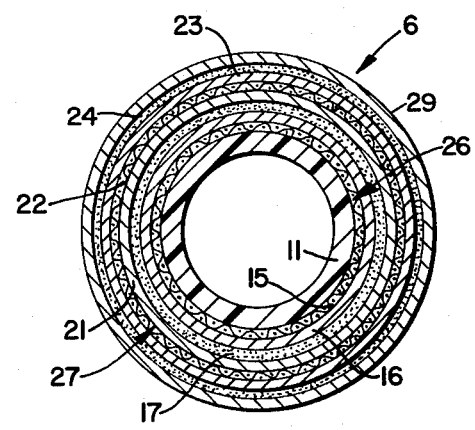
FIG. 4 is an enlarged cross sectional view of the air cleaner.

A protective pipe 29, preferably of sheet metal, fits over the outer filter unit 27 with its open lower end engaging snugly around the ring 28 for retaining said pipe around and spaced from the exterior of the unit 27, as seen in FIGS. 3 and 4. A weather shield or cap 31 is supported above and spaced from the open upper end 32 of the pipe 29 by support members 33 which are welded or otherwise secured in a conventional manner to the pipe 29 and cap 31. The pipe 29 also has a series of circumferentially spaced openings 34 near its lower end and located above and adjacent the collar 28.

Figure 2:
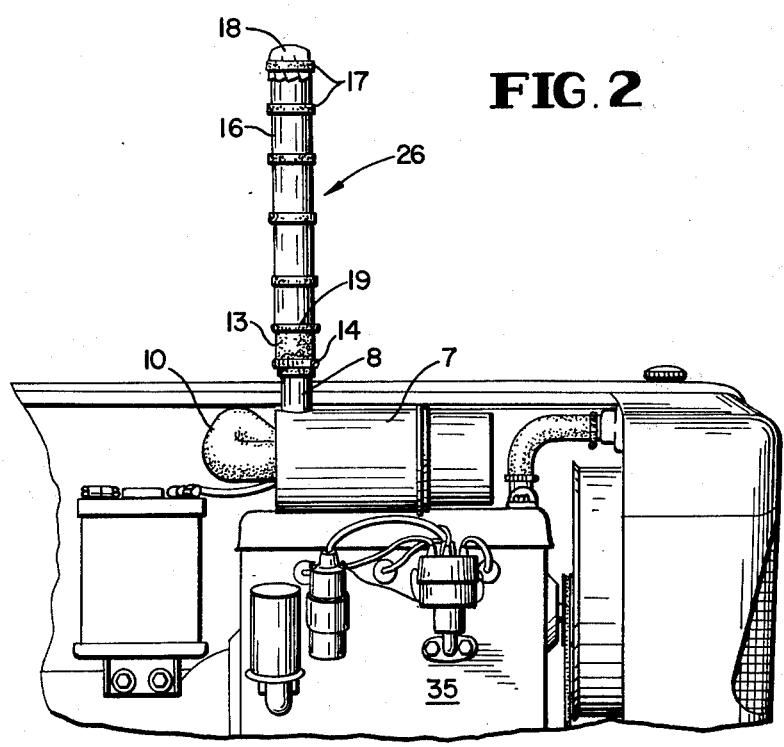
FIG. 2 is a side elevational view of a portion of the air cleaner of FIG. 1 and a part of the tractor engine with the hood removed.

From the foregoing, it will be readily apparent that when an internal combustion engine 35, as seen in FIG. 2, is in operation, air will be drawn into the pipe 29 through the openings 34 but primarily through the open upper end 32 of said pipe. The air will be drawn inwardly through the outer filter cylinder 23 and then through the parts of the screen 32 covering the openings 21 and through said openings. Substantially all of the dust, dirt and grit carried by the air will be removed by the filter 23. The air will then pass through the inner filter cylinder 16 and the screen covered openings 12, after which the twice cleaned air will be drawn downwardly through the collar 13 and inlet pipe 8 into the conventional tractor air filter 7, where the air will again be filtered before passing through the conduit 10 to the carburetor, or turbo-charger of the engine 35.

When the engine 35 is shut off so that there is no longer any suction in the pipe 29, most of the dust, dirt and other foreign matter, which has been separated from the incoming air by the filter cylinder 23, will fall by gravity from the exterior of said cylinder onto the upper surface of the ring 28 and out of said pipe 29 through the openings 34, so that the air cleaner 6 will be at least partially self cleaning.

It will be readily apparent that the air cleaner 6 can be utilized in the same manner with either a gasoline or a diesel engine. Likewise, the air filter 6 can be utilized with either a gasoline or diesel engine as the sole filter for air with the conventional air filter 7, or its equivalent, omitted. In this case, the collar 13 would be connected to the upright inlet end of a conduit leading to the intake of a carburetor or the intake of a turbocharger.

Further, the outer filter unit 27 can be omitted and the single filter unit 26 employed with the pipe 29. With such an installation, the bushing 19 would also be omitted.

The pipes 11 and 20 may be formed on any lightweight substantially rigid material, such as plastic or aluminum. The screen cylinders 15 and 22 may be of a coarse mesh since the purpose of the cylinders is to support the parts of the filter paper cylinders which are disposed over the tube openings, to prevent such said portions from collapsing into the openings.

Various other modifications and changes are contemplated and may be resorted to, without departing from the function or scope of the invention.

We claim as our invention:

1. An air cleaner for an internal combustion engine comprising, an air intake conduit having an upwardly opening substantially rigid inlet end, a substantially rigid tube provided with a plurality of large openings, a collar having one end disposed around and secured to one end of said tube, the other end of said collar being secured around said inlet end of the conduit for supporting the tube in substantially an upright position thereabove, a mesh wire fabric cylinder disposed around said tube and covering the openings thereof, a porous filter paper cylinder disposed around said mesh wire fabric cylinder, means engaging around said filter paper cylinder for retaining said cylinders on the tube, means sealing the opposite upper end of said tube, said tube, the cylinders, the first mentioned means and said last mentioned means constituting a first filter unit; a bushing engaging around a portion of said first filter unit and having an outer diameter larger than the maximum diameter of said first filter unit, a second filter unit, corresponding to said first filter unit but of a larger diameter, said second filter unit engaging over the first filter unit and being retained by said bushing concentrically around and spaced from said first filter unit; a spacer collar disposed around said conduit inlet and having an outer diameter greater than the maximum outer diameter of said second filter unit, and a pipe disposed over said second filter unit and having a lower end engaging around said spacer collar for retaining said pipe substantially concentrically around and spaced from said second filter unit, said pipe having an open upper end defining an air inlet.

2. An air cleaner as in claim 1, said pipe having openings near its lower end and above said spacer collar for the escape therefrom of dirt, grit and foreign matter separated from the air passing through said second filter unit and which falls by gravity onto said spacer collar.

3. An air cleaner as in claim 1, and a weather shield attached to and disposed above the open upper end of said pipe.

4. An air cleaner as in claim 1, said bushing being formed of an elastic material for yieldably engaging said filter units.

* * * * *